Figure 1:
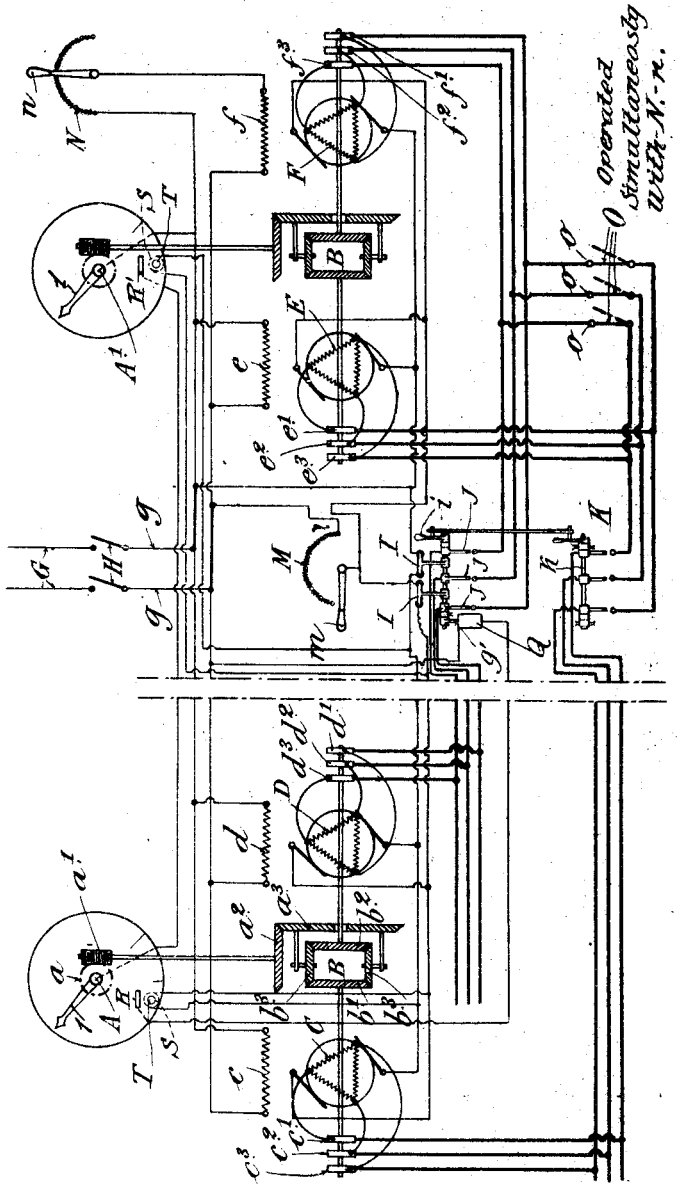

E. SCHNEIDER.
ELECTRICAL CONTROL SYSTEM.
APPLICATION FILED JAN. 20, 1915.

1,200,656.

Patented Oct. 10, 1916.
4 SHEETS—SHEET 1.

E. SCHNEIDER.
ELECTRICAL CONTROL SYSTEM.
APPLICATION FILED JAN. 20, 1915.

1,200,656.

Patented Oct. 10, 1916.
4 SHEETS—SHEET 2.

E. SCHNEIDER.
ELECTRICAL CONTROL SYSTEM.
APPLICATION FILED JAN. 20, 1915.

1,200,656.

Patented Oct. 10, 1916.
4 SHEETS—SHEET 4.

UNITED STATES PATENT OFFICE.

EUGÈNE SCHNEIDER, OF LE CREUZOT, FRANCE.

ELECTRICAL CONTROL SYSTEM.

1,200,656.    Specification of Letters Patent.    Patented Oct. 10, 1916.

Application filed January 20, 1915. Serial No. 3,316.

*To all whom it may concern:*

Be it known that I, EUGÈNE SCHNEIDER, citizen of the Republic of France, residing at Le Creuzot, Saône-et-Loire, France, have invented a new and useful Electrical Control System, which is fully set forth in the following specification.

The present invention has for its object a device for the electrical control at a distance of guns or other mechanisms and applies to installations comprising at the various receiving stations, for each mechanism to be actuated, two motors rotating in a continuous manner in opposite directions and acting upon one and the same differential apparatus thereby controlling the mechanism; consequently when the two motors run synchronously the mechanism to be operated at a distance stops, while its displacements are obtained by variations in the speed of one of the motors. In these installations the transmitting station also comprises a control mechanism governed by a differential connected with two motors running in opposite directions; as the motors of the control mechanism are electrically connected with the corresponding motors of the mechanisms to be operated they constitute instantaneous indicators reproducing at the transmitting station the identical maneuvers carried out at the various receiving stations.

When the source of current available furnishes continuous current, as is generally the case, in order to obtain continuous, synchronous running of the motors at these stations during the periods of stoppage of the mechanisms to be operated, it is necessary to provide means for feeding the motors with alternating current. Hitherto it has been usual, with this object, to supply the various groups of two motors of the receiving stations, and the groups of two motors which actuate the control mechanism of the transmitting station, alternating current generated by two identical dynamos each controlled by a continuous current motor. In this manner the problem of synchronizing the running of alternating current motors of each receiver group during the periods of stoppage is thus simplified so that the problem becomes merely one of synchronizing the running of the two continuous current motors connected with the source of supply. These installations, however, present the inconvenience of necessitating at the transmitting station a minimum group of six dynamo electric machines; the station comprises in addition to the group of two motors for operating the indicating mechanism, two machines for generating alternating current and two continuous current motors connected with the source and operating the generating machines.

In accordance with the present invention a considerable simplification is introduced into the installation of the transmitting station. The group of the two dynamos for generating alternating current and of their operating motors is dispensed with in the following manner:—The two motors for operating the various receiving stations, like the two motors of the indicating mechanism arranged at the transmitting station, are constructed as rotary converters whose field magnets are all and constantly supplied directly by continuous current from the source of supply. The direct connection between the source of continuous current and the groups of two motors (constructed as converters) of the various receiving stations, permits of reducing to two the number of dynamos at the transmitting station. These latter machines constructed as converters at the same time serve as motors for the control mechanism and as generators of alternating current for the supply of the converters of the receiving stations, which act as synchronous motors. These two dynamos of the transmitting station are however, supplied exclusively with continuous current coming from the source of supply. During the periods of stoppage of the mechanisms to be controlled, it therefore becomes necessary to obtain synchronism between them. In accordance with the invention this result is obtained by automatically establishing during the periods of stoppage, a connection between the collector rings of the dynamos, in such a manner as to cause the current generated by the two machines to be supplied through one and the same group of conductors. The communication is automatically established at the moment at which the usual distant control rheostat occupies the positon which corresponds with the stoppage of the mechanisms to be controlled.

An embodiment of the invention is illustrated diagrammatically in the accompanying drawings, in which—

Figure 2:
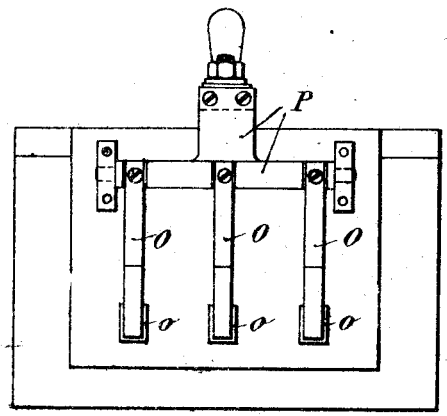
Figure 3:
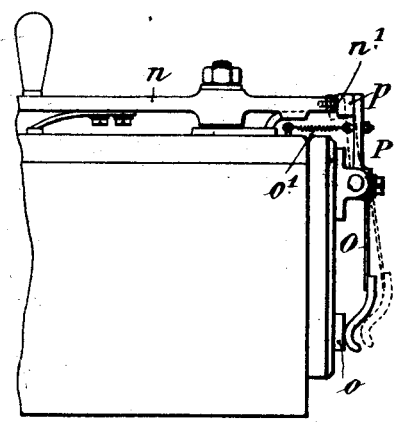
Figure 4:
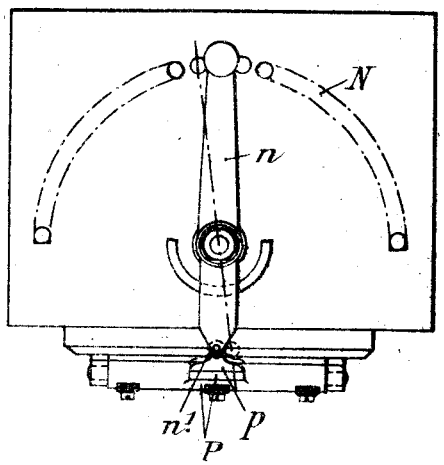
Figure 5:
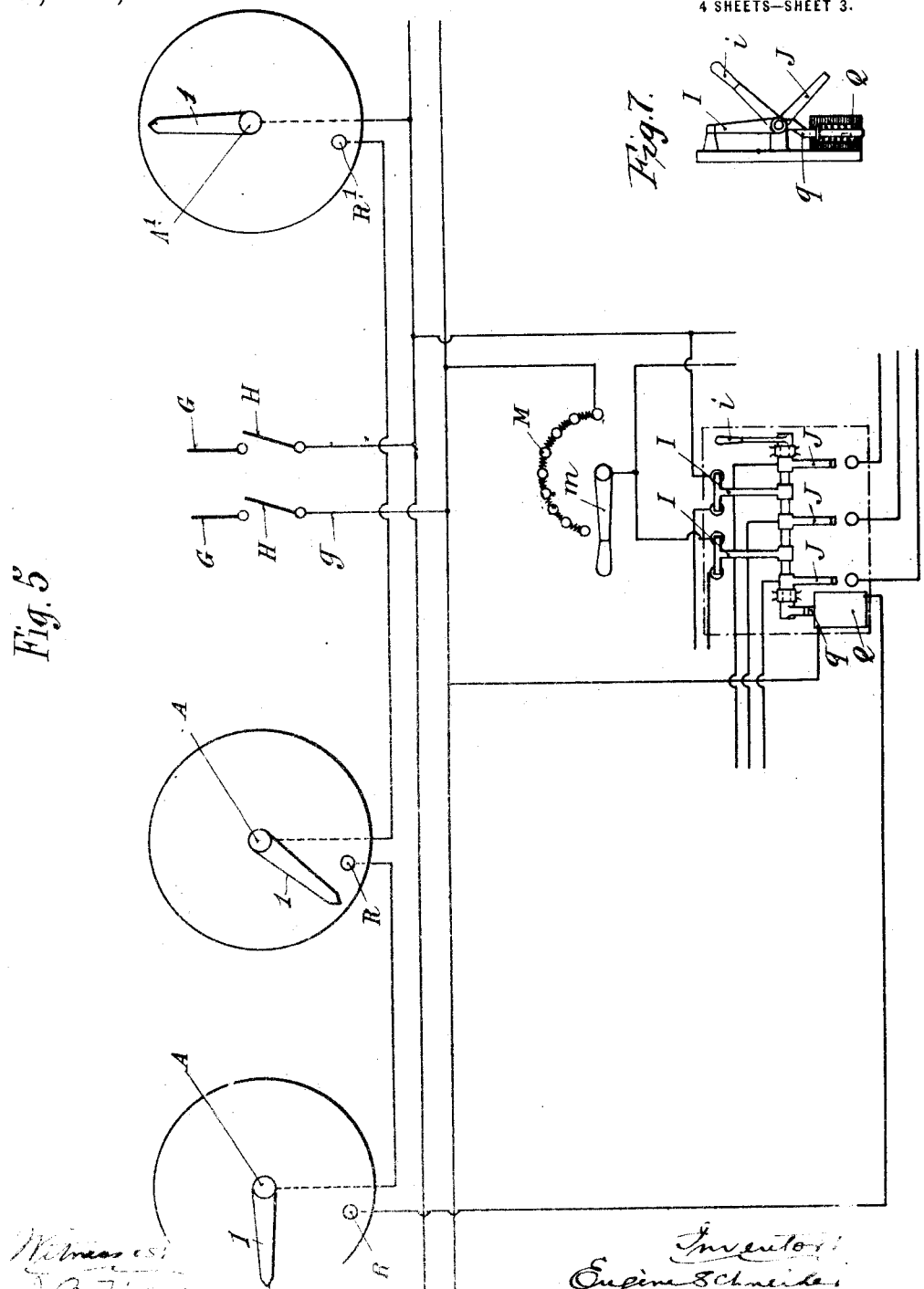
Figure 6:
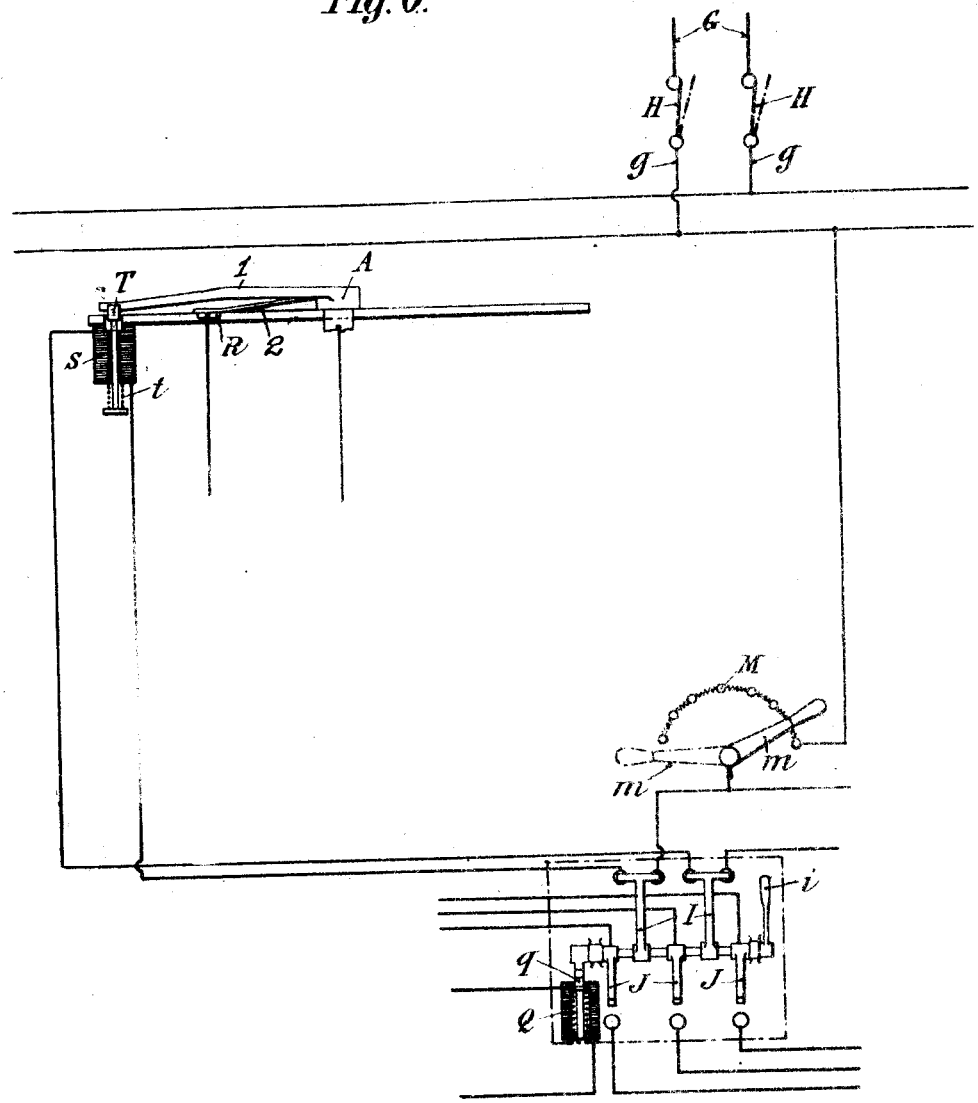

Figure 1 is a diagrammatic representation of the apparatus and electrical connections of a transmitting station and a receiving station; Figs. 2, 3 and 4 show, respectively, a front elevation, side elevation, and plan of a constructional form of the operating rheostat N—n, connected with the switch O; Fig. 5 is a diagrammatic representation of the circuits including the indicators and an interlocked switch; Fig. 6 is a detailed diagrammatic representation of the indicator parts shown in Fig. 5, and Fig. 7 is a detailed view of the locking means mounted on the interlocked switch.

The right hand portion of Fig. 1 represents the transmitting station; the left hand portion represents one of the various receiving stations.

A designates a shaft at the receiving station to be controlled from a distance and connected, by the intermediary of a suitable transmission $a$ $a'$ $a^2$ $a^3$ with the planet pinions $b^3$ of a differential B whose sun wheels $b'$ $b^2$ are respectively controlled by the two dynamos C D.

The transmitting station comprises an indicating mechanism A' connected similarly by a transmission to a differential B whose sun wheels are controlled by the two dynamos E, F respectively.

G is the source of continuous current. The two feed conductors $g$, $g$ receive the current from this source by the intermediary of a switch H. From these conductors are branched the various conductors terminating at the various field magnets $c$ $d$ of the groups of dynamos established at the receiving stations and at the field magnets $e$ $f$ of the dynamos of the transmitting station.

In accordance with the invention, the dynamos C, D like the dynamos E, F, are constructed as converters, with this difference, however, that the dynamos C D of the receiving station act as motors while the machines E F at the transmitting station act as generators. They serve as motors for operating the control indicator mechanism A' while they generate the alternating current intended to supply the various converters C D of the receiving stations.

In the example illustrated, it has been assumed that the converters are arranged for three-phase alternating current; it is, however, obvious that in accordance with the installations and requirements, they might be monophase or of any other periodicity.

$e'$, $e^2$, $e^3$ designate the collector rings of the alternating current for the supply of the converter C; $d'$ $d^2$ $d^3$ are the rings for the alternating current supplying the converted D.

The alternating current for supplying the converters C is obtained from the rings $e'$, $e^2$ and $e^3$ of the converter E; similarly the alternating current for the supply of the converter D is obtained from the rings $f'$ $f^2$ $f^3$ of converter F. A switch I renders it possible to supply continuous current coming from the source of supply to the armatures of the dynamos C, D and to those of the dynamos E, F. When this switch supplies continuous current to the armatures of the dynamos C, D, by means of the arm J it interrupts the connection between the groups of rings $f'$ $f^2$ $f^3$ of the transmitting station; the lever $i$ for actuating the support common to the arms I and J is mechanically connected with a support $k$ for actuating the arms K of a second switch which establishes or interrupts the connection between the rings $e'$ $e^2$ $e^3$ of the transmitting station and the rings $c'$, $c^2$ and $c^3$ of the various receiving station.

M—m is a starting rheostat permitting of distributing the continuous current to the armatures of all the dynamos of the installation.

N—n is an operating rheostat which, in accordance with the invention, is mechanically connected as shown in Figs. 2, 3 and 4 with a switch O intended to automatically interrupt or establish an electrical connection between the group of rings $e'$ $e^2$ $e^3$ and the group $f'$ $f^2$ $f^3$.

In Figs. 2, 3 and 4 lever $n$ of the rheostat carries at its extremity opposite the operating handle a roller $n'$, which, when the lever reaches the stopping position, presses aside the support P of the levers by acting upon the stop $p$ carried by the support. This stop comprises two inclined profiles on either side of a stop notch of the roller. It will be noted that in the position corresponding to the stoppage of the mechanisms to be controlled, the lever $n$ causes the support P and the three arms O to rock and brings their extremities into contact with the contacts $o$ in extending the counter spring $o'$ which in all the operative positions of the rheostat retains the arms O in the position indicated in broken lines corresponding to interruption of the circuit establishing connection between the collector rings $e'$ $e^2$ $e^3$ and the rings $f'$ $f^2$ $f^3$.

The installation described operates in the following manner:—The switches I, J, K occupying the position indicated in Fig. 1, if the switch H be operated the continuous current is distributed to the field magnets $e$, $f$ of the transmitting station and to the field magnets $c$, $d$ of the various receiving stations. By operating the rheostat M—m the armatures of the converters E, F are supplied with continuous current as are also the armatures of the converters C, D of the various receiving stations. As a result all the converters of the installation are started as continuous current motors.

Now if the switch members I be in open position, the supply of continuous current to the armatures of the dynamos C, D is interrupted at I while connection is established by switch members J and K respectively between the rings $f'$ $f^2$ $f^3$ and the rings $d'$ $d^2$ $d^3$ on the one hand and connection between the group $e'$ $e^2$ $e^3$ and the rings $c'$ $c^2$ $c^3$ on the other hand. As a result the dynamos E, F which continue to act as motors for the operation of the indicating device A', at the same time act as generators of alternating current which supply the converters of the various receiving stations.

Consequently synchronism is obtained between C and D so long as the alternating current furnished by E is identical with the alternating current furnished by F. This synchronism is only necessary during the periods of stoppage of the mechanisms A and A'. During these periods the rheostat N—n occupies the position of repose indicated in full lines in Fig. 1, and in the detail in Figs. 2, 3 and 4, the switch O taking the position shown in full lines. The two motor-dynamos E, F having their rings connected one with the other, their synchronism is established in known manner.

When it is desired to actuate the mechanisms A at speeds that can be modified as desired, the rheostat N—n is operated by displacing it to the right or to the left according to the direction of running to be obtained, the extent of the displacement depending upon the speed with which it is desired to produce the movements. The displacement of N—n serves to interrupt by the switch O, the circuit establishing the connection between $e'$ $e^2$ $e^3$ and $f'$ $f^2$ $f^3$. The rheostat N—n being placed upon the circuit of the field magnet $f$, the movements of this rheostat produce variations of speed of the converter F which result in corresponding variations of the speeds of the converters D. The mechanisms A and A' therefore execute identical displacements and in the same direction at the speeds selected.

In order to assure departure from a common initial position for all the mechanisms to be controlled, it is essential to be able, when starting, to return the various mechanisms, which may occupy various positions, to this initial position. Advantage is taken of the fact that continuous current motors, as usually designed, possess different characteristics. Direct current is supplied to the motor-generators C, D, E and F when switches H, M and I are closed. Owing to the lack of synchronism in these motors, they cause the differential mechanisms to drive the mechanisms to be controlled and move them into the predetermined starting positions. By aid of electromagnetically controlled locking means for the switches I, J, K adapted to be released when the initial positions are reached, the various mechanisms may be started from this position by establishing a circuit for alternating current through the motor-generators as described below.

In the position indicated in Fig. 1, the switches I, J, K are maintained locked by the spring-pressed armature $q$ of an electromagnet Q (Fig. 7). The release of this locking device is only possible under the action of the coil Q when the winding of the latter is energized by a passage of current, which takes place only at the moment at which all the elements A, A . . . and A' to be operated have stopped at the common initial position. Mounted on revoluble shafts A, A, and on the shaft of the indicating mechanism A', are arms 1. Each of these arms is provided with a spring contact 2, as shown in Fig. 6, adapted to engage a contact R, when the arm carrying the spring contact moves into a predetermined position, and to close a circuit through coil Q including in series the spring contacts and the stationary contacts R to R'. In order that arms 1, initially rotated by the direct current supplied to motor generators C, D, E, F, may stop when the spring contacts reach the stationary contacts, a spring stop T—t, Fig. 6, is provided for each of these arms consisting of a stop member T normally held in the path of the rotating arm 1 by an electro-magnet S against the retractile force of a spring $t$. The coil of the magnet S is energized by direct current through a circuit controlled by the contacts of switch I. When each of the arms 1 has moved into engagement with its respective stop T, the spring contact 2, carried by each arm, rests on its respective stationary contact R, R, R' at the various receiving stations and the transmitting station. The circuit is then closed through coil Q, spring-pressed latch $q$ is withdrawn, and switches I, J and K are unlocked. As soon as the switches I, J, K are operated, however, the interruption of the excitation circuit of the armatures of the motors C, D is effected at I and produces the cessation of the excitation of the electromagnets S, whereby the springs $t$ are able to press the stops T aside. The simultaneous closing of the switches J, K connects the alternating current side of the motor generators at the transmitting station with those at the receiving stations. The machines will now start from a common initial position and can be controlled by switch N—n as described.

What I claim and desire to secure by Letters Patent of the United States is:—

1. In a control system, rotary converters mechanically connected by a compensating device, a movable member associated with said device, other rotary converters mechanically connected by a compensating device and electrically connected to said first-named converters, a second movable member associated with said second compensating device, and means associated with the first-named converters for controlling said second movable member.

2. In a control system, rotary converters mechanically connected by a compensating device, a movable member associated with said device, other rotary converters mechanically connected by a compensating device and electrically connected to said first-named converters, a second movable member associated with said second compensating device, and means controlling the field of one of said first-named converters which through said electrical and mechanical apparatus moves said second movable member.

3. In a control system, rotary converters mechanically connected by a compensating device, a movable member associated with said device, other rotary converters mechanically connected by a compensating device and electrically connected to said first-named converters, a second movable member associated with said second compensating device, and control means associated with one of said first-named converters for varying the speed thereof thereby causing simultaneous movement of said movable members.

4. In a control system, a revoluble member, rotary converters differentially connected for driving the same, a second revoluble member, remotely situated rotary converters differentially connected for driving said second member, electrical connections between the alternating current sides of said converters, a direct current supply for all of said converters, and means for simultaneously cutting out the direct current supply to the remotely situated converters and for connecting the same with the alternating current sides of the first-named converters.

5. In an electric control system, a plurality of motor generators having direct current sides and alternating current sides, compensating means connecting said machines in pairs, one of said pairs constituting a driving pair for the other pairs, devices to be controlled operatively connected to said compensating means, field windings for said machines connected in parallel with a source of direct current, circuits connecting the alternate current sides of the driving pair with similar sides of the other machines, other circuits connecting the direct current sides of the machines with a source of current, and switching means for opening one of said last-named circuits and closing the alternating current circuits.

6. In an electric control system, a plurality of motor generators, having direct current sides and alternating current sides, compensating means connecting said machines in pairs, one of said pairs constituting a driving pair for the other pairs, devices to be controlled operatively connected to said compensating means, field windings for said machines connected in parallel with a source of direct current, circuits connecting the alternate current sides of the driving pair with similar sides of the other machines, other circuits connecting the direct current sides of the machines with a source of current, switching means for opening one of said last-named circuits and closing the alternating current circuits, and means in the field circuit of one of the driving machines for controlling the movement of said devices.

7. In an electric control system, a plurality of motor generators, having direct current sides and alternating current sides, compensating means connecting said machines in pairs, one of said pairs constituting a driving pair for the other pairs, devices to be controlled operatively connected to said compensating means, field windings for said machines connected in parallel with a source of direct current, circuits connecting the alternate current sides of the driving pair with similar sides of the other machines, other circuits connecting the direct current sides of the machines with a source of current, switching means for opening one of said last-named circuits and closing the alternating current circuits, means in the field circuit of one of the driving machines for controlling the movement of said devices, and switching means operatively connected to said last-named means for closing a path between said alternating current circuits for synchronizing said machines and stopping movement of said devices.

8. In a control system, a plurality of motor generators, compensating means connecting said machines in pairs, and contact arms operatively connected to said means, circuits connecting said motor generators and a source of current, switching means in said circuits provided with locking means, and electromagnetic means in a circuit controlled through said contact arms for unlocking said locking means.

9. In a control system, a plurality of motor generators, compensating means connecting said machines in pairs, and contact arms operatively connected to said means, circuits connecting said motor generators and a source of current, switching means in said circuits provided with locking means, electromagnetic means in a circuit controlled through said contact arms for unlocking said locking means, electromagnetic stop means for said arms, and circuits for energizing the same controlled by said switching means.

10. In a control system, sets of dynamo electric machines, each set connected through a compensating device to a movable member, indicators operated by said movable members, switching means in circuit connections between said sets, and provided with locking means and means in circuit with said indicators for unlocking said switching means.

11. In a control system, dynamo electric machines, said machines being mechanically connected by differential gearing, remotely situated dynamo electric machines adapted to be driven by said first-named machines, said second-named machines being mechanically connected by a differential gearing, and indicators associated with said differential gearings and movable in response to relative variation in speeds of said machines.

12. In a control system, a movable member, dynamo electric machines differentially connected to said movable member, means for driving said machines, a second movable member, a second set of dynamo electric machines connected to said second movable member by a differential device, electrical connections between said first-named and said second-named machines for driving the latter, other means for driving said second set of machines when not driven by said first machines, and means associated with said first-named machines for controlling the latter and thereby the movement of said movable members.

13. In a control system, dynamo electric machines in a central station normally driven at constant speed, a movable member provided with an indicator connected to said machines through a compensating device, like apparatus in a sub-station, switching means for electrically connecting the machines in the central station with the machines in the sub-station, and controlling means for relatively varying the speeds of the machines in the central station thereby causing the movement of the movable member in the sub-station and for electrically connecting the machines in the central station with each other when their speeds are substantially equal.

14. In a control system, sets of dynamo electric machines, said sets being adapted to be electrically connected, a source of current supply for each set, and control means acting through one of said sets for controlling another of said sets, and for electrically connecting together the machines in one of said sets.

In testimony whereof I have signed this specification in the presence of two subscribing witnesses.

EUGÈNE SCHNEIDER.

Witnesses:
CHARLES CABORN,
JOHN J. ERNESTER.